(12) United States Patent
Gemmati

(10) Patent No.: US 7,311,745 B2
(45) Date of Patent: Dec. 25, 2007

(54) DEVICE FOR HEATING AND/OR DEMISTING A VEHICLE

(75) Inventor: Bernard Gemmati, Lauris (FR)

(73) Assignee: Eurocopter, Marignane (FR)

(*) Notice: Subject to any disclaimer, the term of this patent is extended or adjusted under 35 U.S.C. 154(b) by 389 days.

(21) Appl. No.: 11/013,793

(22) Filed: Dec. 17, 2004

(65) Prior Publication Data

US 2005/0132678 A1   Jun. 23, 2005

(30) Foreign Application Priority Data

Dec. 19, 2003  (FR) .................................. 03 14977

(51) Int. Cl.
  B01D 45/00  (2006.01)
(52) U.S. Cl. .................. 55/406; 55/385.3; 55/407; 95/270
(58) Field of Classification Search ........... 55/385.3, 55/400, 406, 407; 95/270, 400, 406, 407
See application file for complete search history.

(56) References Cited

U.S. PATENT DOCUMENTS

| | | | | |
|---|---|---|---|---|
| 2,721,456 A | | 10/1955 | Whitney et al. | |
| 3,645,070 A | * | 2/1972 | Roe | .............................. 96/281 |
| 3,767,045 A | * | 10/1973 | Voelskow | .................... 209/710 |
| 3,816,981 A | * | 6/1974 | Carnewal et al. | .......... 55/282.5 |
| 3,825,212 A | * | 7/1974 | Darges et al. | ........... 244/118.5 |
| 3,884,656 A | * | 5/1975 | Deane | .......................... 96/359 |
| 4,006,938 A | * | 2/1977 | Reiterer | ...................... 406/162 |
| 4,308,993 A | * | 1/1982 | Buss | .......................... 237/2 A |
| 4,334,411 A | | 6/1982 | Payne | |
| 4,361,490 A | * | 11/1982 | Saget | .......................... 210/787 |
| 4,382,804 A | * | 5/1983 | Mellor | ......................... 95/270 |
| 4,506,655 A | * | 3/1985 | Kuechler | ................ 126/299 D |
| 4,978,064 A | * | 12/1990 | Steiner | .................. 237/12.3 A |

* cited by examiner

Primary Examiner—Duane Smith
Assistant Examiner—Sonji Turner
(74) Attorney, Agent, or Firm—Young & Thompson

(57) ABSTRACT

A heater and/or demister device D for installing in a heater and/or demister circuit of a vehicle. The device D is provided with a fan 7 for producing a flow of warm air from a flow of ambient air and a flow of compressed hot air taken from an engine of the vehicle. The device comprises a cylindrical outer body 9 surrounding the fan 7 and an impeller 3, the impeller 3 being fed with the flow of compressed hot air and driving the fan 7.

9 Claims, 2 Drawing Sheets

DEVICE FOR HEATING AND/OR DEMISTING A VEHICLE

The present invention relates to a heater and/or demister device for installing in a heating and demisting circuit of a vehicle, in particular a vehicle of the rotorcraft type, making use of a hot compressed gas taken from the engine installation of the vehicle.

BACKGROUND OF THE INVENTION

In general, devices are known that diffuse a flow of warm air, e.g. in the cockpit of a rotorcraft, both under the seats of the occupants (heater function), and over the windshield (demisting function).

A first known device comprises an electric fan serving to cause cold ambient air to circulate along a heater and/or demister circuit. A flow of hot air, made up of a compressed gas picked up from the outlet of the compressor of the rotorcraft engine, is propelled into this heater and/or demister circuit via an injector. Under such conditions, on mixing, the flow of ambient air and the flow of hot air create a flow of warm air which is subsequently delivered to the cockpit of the rotorcraft. The pilot can adjust the temperature of the flow of warm air by reducing or increasing the flow rate of the hot air.

That first device is effective, but it presents the drawback of being very noisy, where the noise is the result of the hot air flow being ejected, and can be as high as one hundred decibels.

A second known device operates on the same principle but does not make use of an electric fan. The flow of hot air is accelerated by an injector which opens out into the throat of a venturi, thereby creating suction that sucks in cold air from the surroundings.

That second device has the advantage of not consuming electricity, but it remains extremely noisy insofar as the flow of hot air continues to be ejected in the same manner. Hearing the noise continuously quickly makes perception of the noise intolerable.

OBJECTS AND SUMMARY OF THE INVENTION

Consequently, an object of the present invention is to remedy those drawbacks by limiting the noise generated by the heater and/or demister device.

In addition, another object of the invention is to limit the size of the heater and/or demister device so as to enable it to be integrated in most existing rotorcraft.

According to the invention, a heater and/or demister device for installing in a heater and/or demister circuit of a rotorcraft is provided with a fan suitable for producing a flow of warm air from a flow of ambient air and a flow of hot air constituted by a compressed gas taken from the engine of the rotorcraft. According to the invention, the device is remarkable in that comprises a cylindrical outer body surrounding the fan and an impeller, said impeller being fed with the flow of compressed hot air and driving the fan.

In addition, the device of the invention includes at least one injection orifice enabling the impeller to be fed by the flow of hot air, said feed being tangential to the diameter of the impeller.

In addition, at least one rib fixed to the cylindrical outer body of the heater and/or demister device is advantageously streamlined so as to improve the flow of ambient air passing through the device.

BRIEF DESCRIPTION OF THE DRAWINGS

The present invention and its advantages appear in greater detail below from the following description of an embodiment given by way of illustration and with reference to the accompanying drawings, in which.

MORE DETAILED DESCRIPTION

Elements that are present in more than one of the figures are given the same references in all of them.

Figure 1:
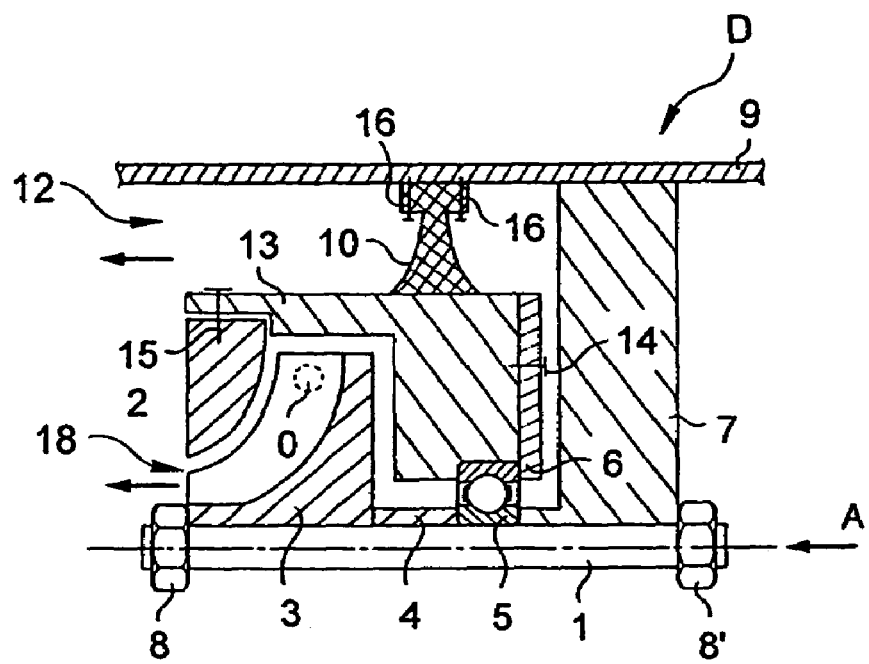
FIG. 1 is a radial section of a heater and/or demister device of the invention.
Figure 2:
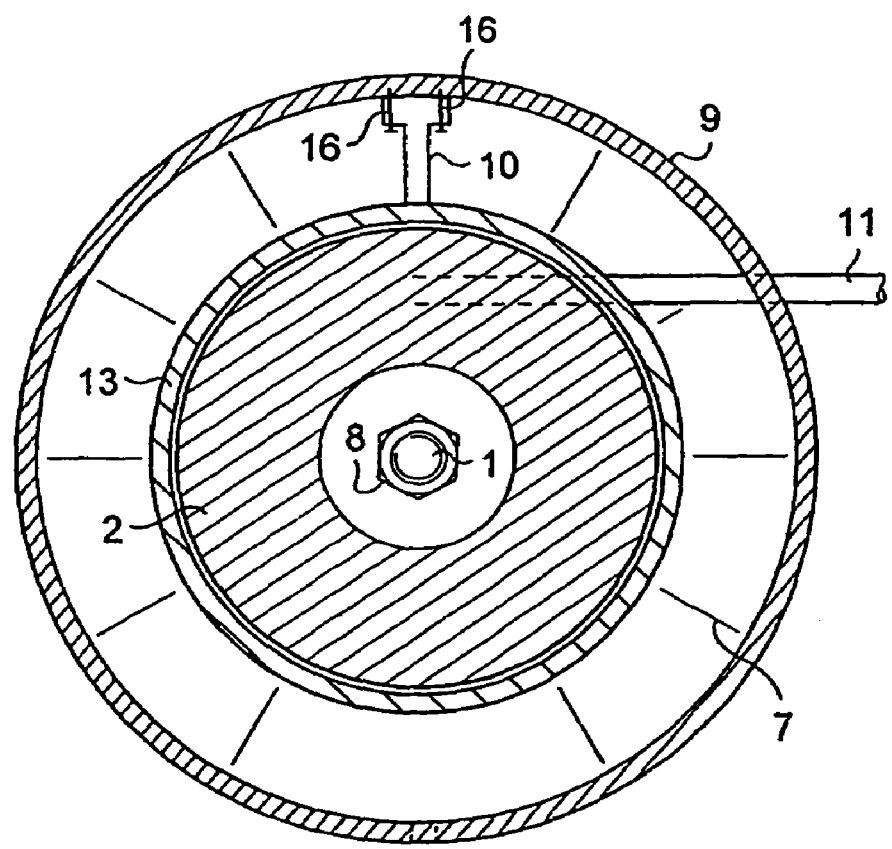
FIG. 2 is an axial end view of a heater and/or demister device of the invention.

FIGS. 1 and 2 show a heater and/or demister device D of the invention.

The device D comprises a cylindrical outer body 9 having a rib 10 fixed thereon, e.g. by rivets or by first screws 16. This rib 10 is secured to a support 13 and is advantageously streamlined so as to improve the flow of ambient air passing through the device D. Advantageously, the device D is provided with a plurality of ribs.

A ball bearing 5 is engaged in the support 13. In addition, a flange 6 secured to the support 13 by at least one second screw 14 serves to hold the ball bearing 5 in place.

A shaft 1 inserted in the ball bearing 5 is provided with moving elements for rotating about the axis A, specifically an impeller 3, a fan 7, and a spacer 4 for adjusting the position of the impeller 3. Two nuts 8 and 8' hold these moving elements in place, preventing them from moving in translation relative to the rib 10, and as a result relative to the cylindrical outer body 9.

Finally, a cover 2 is secured to the support 13 by at least one third screw 15 and partially closes the space that exists between the impeller 3 and the support 13.

The device D as made in this way is thus particularly compact, thus making it easier to arrange on existing rotorcraft.

Furthermore, a hot air feed tube 11 passing through the body 9 and the support 13 delivers a flow of hot air constituted by a compressed gas to an injection orifice O, the air traveling tangentially to the diameter of the impeller 3.

The flow of hot air is thus ejected against the blades of the impeller 3 via the injection orifice O. This flow of hot air is subsequently expelled from the device D via an opening 18. Experience shows that the expansion of the compressed gas constituting the flow of hot air takes place progressively, which means that the noise caused by the ejection of the gas is strongly attenuated.

The pressure exerted by the flow of hot air on the blades of the impeller 3 enables the impeller to be set into rotation about the axis A. By means of the shaft 1, the impeller 3 drives the fan 7. This fan 7 then sucks in cold ambient air that is located upstream from the device D, the ambient air being taken either from the inside or from the outside of the vehicle, and is it delivered via an opening 12. The flow of hot air coming from the opening 18 is thus mixed with the flow of ambient air downstream from the device D, thereby creating a flow of warm air.

As shown below, the device D is arranged in such a manner as to deliver the flow of warm air as produced in this way to the heater and demister circuit.

In a variant of the invention, a plurality of hot air feed tubes are placed around the device D, thus delivering compressed hot air to the impeller 3 at a plurality of distinct points.

Figure 3:
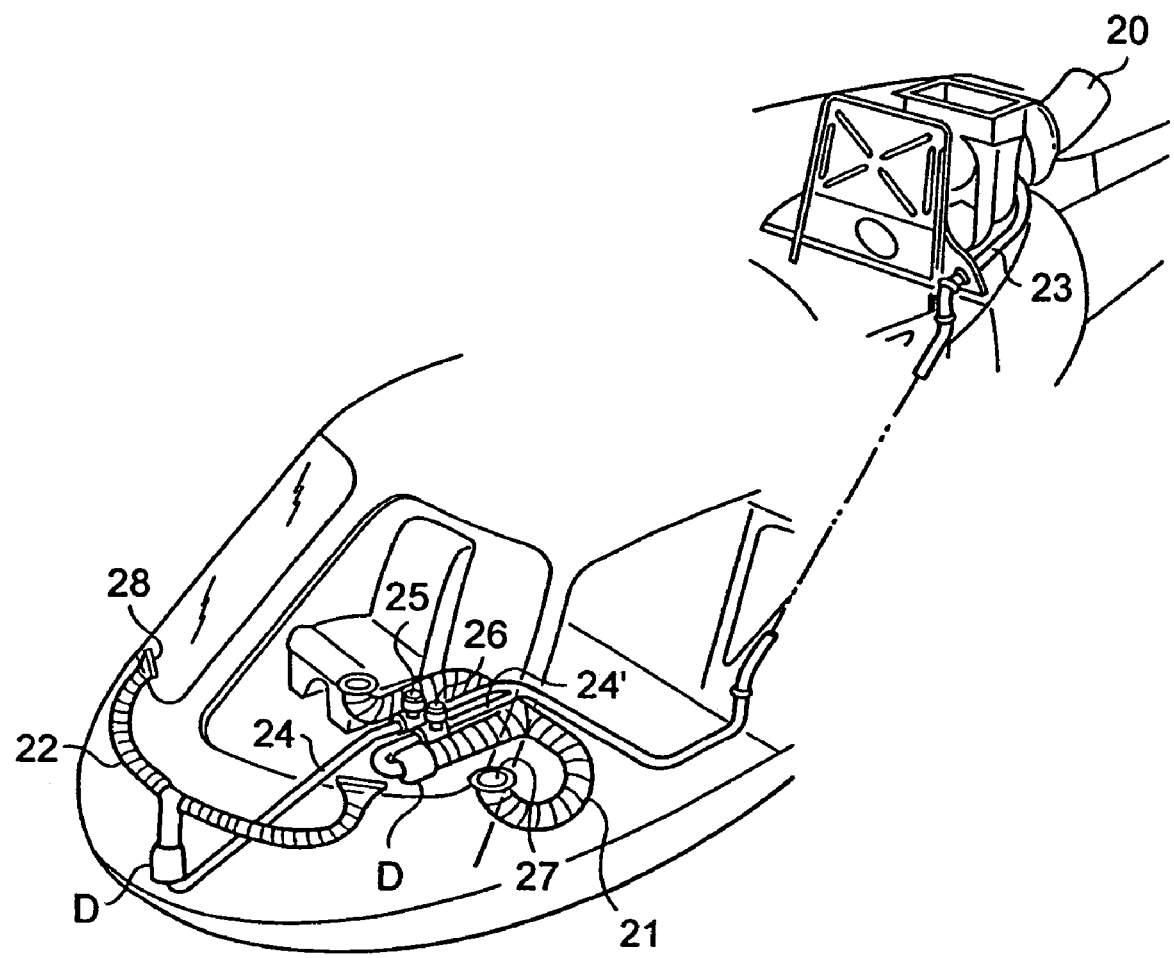
FIG. 3 is a diagrammatic view of how the device is installed in a heater and/or demister circuit of a rotorcraft.

FIG. 3 is a diagram showing a heater circuit 21 and a demister circuit 22 for a rotorcraft fitted with two devices D of the invention.

A flow of hot air constituted by a compressed gas, taken from the outlet of the compressor of an engine 20, is directed to the cockpit of the rotorcraft via pipework 23. This flow of hot air is subsequently transferred to the heater circuit 21 and to the demister circuit 22 respectively via a first hot air feed line 24' and a second hot air feed line 24.

The device D of the invention, disposed between the demister circuit 22 and the first hot air feed line 24 produces a flow of warm air from the hot air flow taken from the engine and a flow of cold ambient air taken from the cockpit. In addition, the fan 7 of the device D entrains its flow of warm air towards two demisting outlets 28. The flight crew of the rotorcraft can adjust the temperature of the warm air flow by modulating the hot air flow rate upstream from the device D by means of a cock 25.

In the same manner, the device D arranged between the heater circuit 21 and the second hot air feed line 24' produces and drives a flow of warm air towards heater outlets 27. This flow of hot air can likewise be modulated by means of a cock 26.

Naturally, the present invention is capable of numerous variations concerning its implementation. Although several embodiments are described, it will be understood that it is not conceivable to identify exhaustively all possible embodiments. Naturally, means described could be replaced by any equivalent means without going beyond the ambit of the present invention.

What is claimed is:

1. A heater and/or demister device for installation in a heater and/or demister circuit of a vehicle, comprising a fan and an impeller, a cylindrical outer body surrounding the fan and impeller, means to supply ambient air to the fan, means to supply to the impeller compressed gas taken from an engine of the vehicle thereby to drive the impeller in rotation, and means to drive the fan in rotation by said impeller.

2. A device according to claim 1, including at least one injection orifice enabling said impeller to be fed with said compressed gas.

3. A device according to claim 1, wherein said compressed gas is injected tangentially to the diameter of said impeller.

4. A device according to claim 1, wherein at least one rib secured to said cylindrical outer body of said device is streamlined so as to improve the flow of ambient air passing through said device.

5. A device according to claim 1, wherein said impeller and said fan are arranged on a shaft, a spacer and a ball bearing being disposed between said impeller and said fan.

6. A device according to claim 5, wherein said ball bearing is engaged in a support while being held thereagainst by a flange.

7. A device according to claim 6, wherein said support is secured to at least one rib which is secured to said cylindrical outer body.

8. A device according to claim 1, said fan and said impeller having a common outlet.

9. A device according to claim 1, said fan and impeller being coaxial.

* * * * *